May 30, 1967
J. H. HOLLOWAY
3,323,009
ATOMIC BEAM DEVICE HAVING MAGNETIC SHIELDS
ABOUT THE RADIO FREQUENCY SECTION
Filed April 1, 1963
2 Sheets-Sheet 1
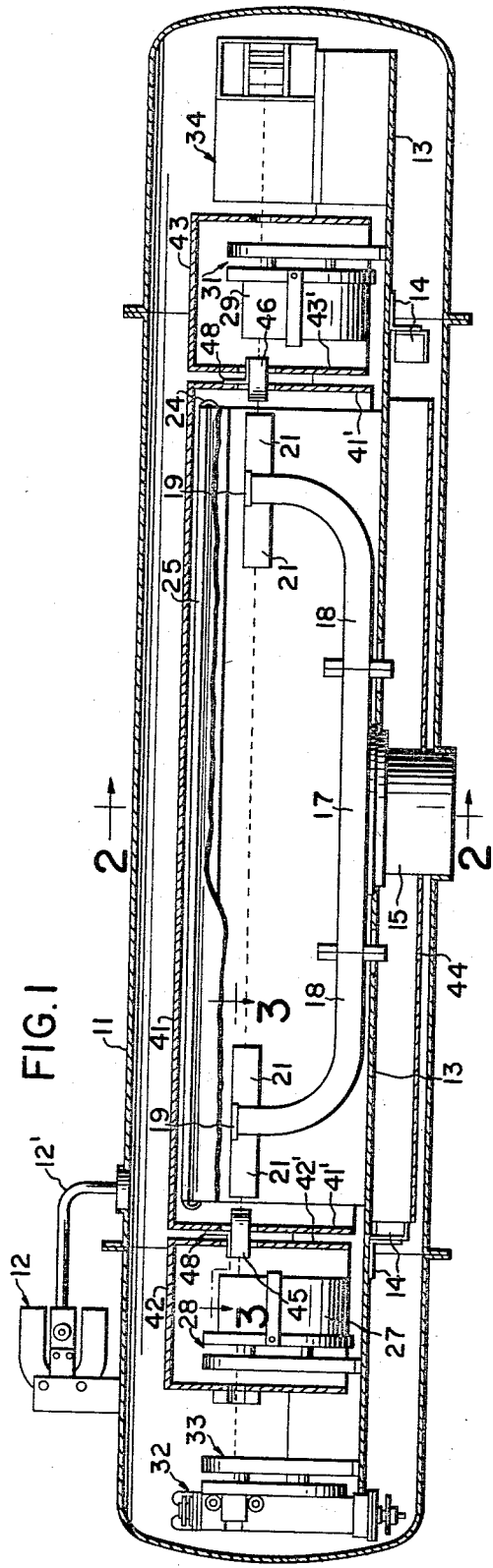
INVENTOR.
JOSEPH H. HOLLOWAY
BY
*Wm J. Nolan*
ATTORNEY May 30, 1967  J. H. HOLLOWAY  3,323,009
ATOMIC BEAM DEVICE HAVING MAGNETIC SHIELDS
ABOUT THE RADIO FREQUENCY SECTION
Filed April 1, 1963  2 Sheets-Sheet 2
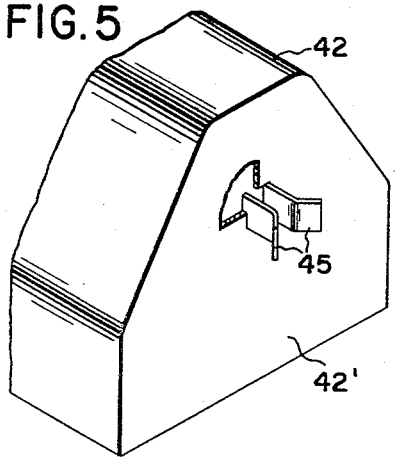
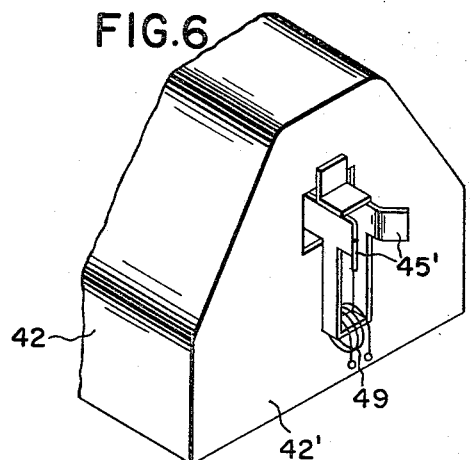
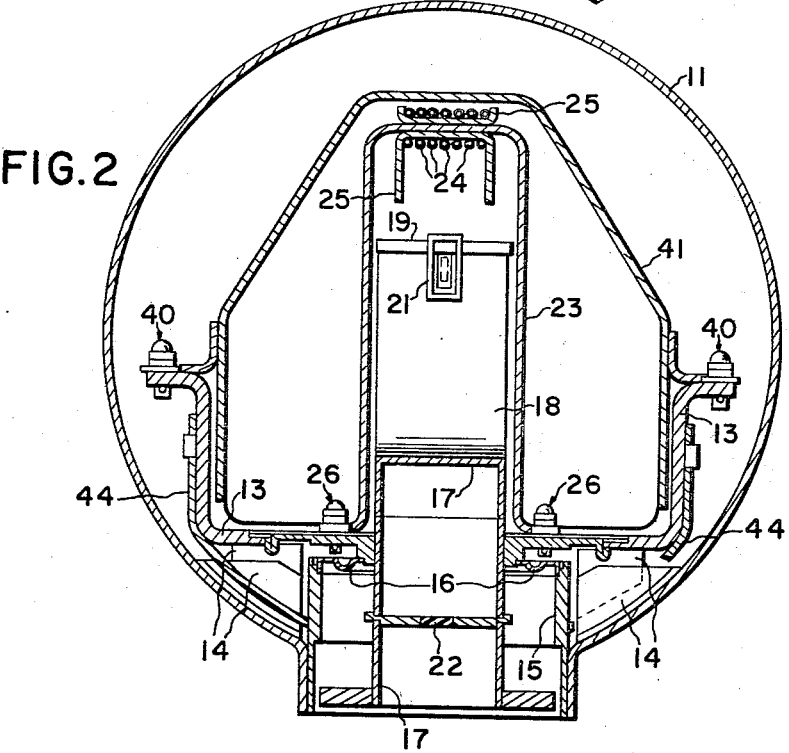
INVENTOR.
JOSEPH H. HOLLOWAY
BY
*Wm. J. Nolan*
ATTORNEY United States Patent Office 3,323,009
Patented May 30, 1967

3,323,009
ATOMIC BEAM DEVICE HAVING MAGNETIC SHIELDS ABOUT THE RADIO FREQUENCY SECTION
Joseph H. Holloway, Topsfield, Mass., assignor, by mesne assignments, to Hewlett-Packard Company, Palo Alto, Calif., a corporation of California
Filed Apr. 1, 1963, Ser. No. 269,683
13 Claims. (Cl. 315—111)

This invention relates, in general, to atomic beam apparatus and, more particularly, to atomic beam tubes utilized in magnetic hyperfine resonance transition systems.

Atomic beam tubes find present-day use as the basic reference elements in extremely stable frequency standards in, for example, systems for precisely measuring time and/or frequency. Such an atomic beam tube has been described and claimed in U.S. patent application Ser. No. 233,573 filed Oct. 29, 1962, by Joseph H. Holloway and Joseph W. Anderson and entitled "Atomic Beam Apparatus." Basically, the beam tube comprises a beam source for generating the atomic beam, a first deflecting or state-selecting magnet, commonly referred to as the A magnet, through which the beam is passed for selecting the atom particles from one of the desired energy states in which the atom particles in the beam exist for transmittal into the radio frequency transition section of the tube. In the radio frequency transition section of the tube the atom particles undergo magnetic hyperfine resonance transitions, i.e., transitions from one energy state to the other. This is accomplished by applying radio frequency energy to the atom particles at the transition frequency of the particular particles in the presence of a uniform magnetic field of proper orientation relative to the R.F. field, this magnetic field being of low value—for example, one twentieth of a gauss, relative to the A magnet which may be, for example, 10 kilogauss. The atom particles pass out from the radio frequency transition section of the tube into a second deflecting or state-selecting magnet, commonly referred to as the B magnet, which is similar to the A magnet. The atom particles which have undergone R.F. transition will be directed by the B magnet field onto a suitable beam detector as an indication that magnetic resonance has occurred, whereas, in the absence of resonance transitions, the beam will be caused to miss the target or detector.

These beam tubes require that the A and B magnets, which are positioned on either side of the R.F. section, be very strong and that the magnetic field produced in the R.F. section (by a magnet commonly referred to as the C magnet) be relatively weak and homogeneous. It is, therefore, necessary that the C magnet region be carefully and properly shielded from the A and B magnet fields and also from extraneous fields including the earth's magnetic field (approximately one-half gauss). Such shielding must, of course, permit ingress and egress to the R.F. transition section for the atom beam particles but the axial beam openings should be kept to a small size to retain the shielding effect.

It has been discovered that fringing magnetic fields exist at these ingress and egress openings which, in some instances during use and as a result of particular orientation of the beam tube in the presence of external magnetic fields, become rapidly changing fields or fields which even reverse in direction at such openings. This field turbulence or reversal at the ingress or egress to the R.F. section gives rise to spontaneous transitions in the atomic beam which, as far as the beam indicator is concerned, are registered as the desired and sought for radio frequency transitions, thus falsely indicating resonance. Such forms of undesired transitions are commonly known as Majorana transitions.

By means of particularly effective magnetic apparatus located at the points of ingress and egress to the shielded C magnet region of such atomic beam tubes, the present invention serves to eliminate such false transitions for all orientations in external magnetic fields such as the earth's field and also for all instances of random fields occurring from time to time due to, for example, fringe fields from small magnets brought near the tube.

It is, therefore, the object of the present invention to provide a new and improved form of atomic beam tube incorporating novel magnetic field shaping and forming means along the beam path to prevent Majorana transitions.

One feature of the present invention is the provision of a novel magnet field control means at the ingress and egress points of the C-magnet section shield for proper magnet field shaping in such areas.

Another feature of the present invention is the provision of field control means of the above featured type which comprises a pair of pole pieces positioned at each point of ingress and egress for proper field shaping.

Another feature of the present invention is the provision of a novel pole piece apparatus of the immediately preceding featured type wherein the pole pieces may be energized from the A and B magnets or from an external source.

These and other features and advantages will become apparent from a perusal of the following specification taken in connection with the accompanying drawings wherein, FIG. 1 is a longitudinal cross-sectional view of an atomic beam tube incorporating the present invention, FIG. 2 is a cross-sectional view of the beam tube of FIG. 1 taken along section lines 2—2 in the direction of the arrows, FIG. 3 is a top view of a portion of the tube of FIG. 1 taken along line 3—3 therein, FIG. 4 is a perspective view of a portion of the tube elements shown in FIG. 3, FIG. 5 is a perspective view of an alternative construction for the elements shown in FIG. 4, and FIG. 6 is a perspective view of another alternative construction for the elements shown in the earlier figures.

Referring now to FIGS. 1, 2, 3, and 4 there is shown one typical form of atomic beam tube, i.e., a cesium beam tube, which incorporates the present invention. This tube includes the vacuum sealing shell 11 in which the vacuum is maintained by an electrical getter ion vacuum pump 12 which continuously pumps the vacuum envelope in use via an exhaust tubulation 12'.

A substantially U-shaped support or base channel 13 is secured by means of support lugs or tabs 14 on the shell 11, this elongated support base serving to support the various tube elements in axial alignment in the tube. A hollow cylindrical member 15 is fixedly secured in an opening in the shell 11 and is also fixedly secured to the support 13 via flexible diaphragm 16 to give further support to the channel 13.

An X-band waveguide structure 17 passes into the shell 11 through the cylinder 15, the waveguide branching into two arms 18 for dividing the microwave power into the two arms, these arms being terminated by walls 19 which close off and short the ends of the X-band guide to form two cavity resonators.

The shorted end portions of the waveguide 18 are provided with rectangular openings in opposite walls of the guide in axial alignment with the beam path. Short sections of smaller K band guide 21 are fixed to the X band guide in axial alignment with the beam path and in registry with the rectangular openings. The K band guide sections are cut off to the applied X band microwave power and thereby prevent escape of wave energy through the beam openings into the spaces between the axially spaced cavity sections.

A conventional vacuum tight window 22 is brazed across the X band guide, thereby completing the vacuum envelope.

The C-field is provided by a C-field electromagnet including an elongated U-shaped channel member 23 made of a good magnetic permeable material as of, for example, mumetal. The C-field magnet is energized by a C-field coil 24 wound around the channel 23 in the axial direction and retained in position by a pair of oppositely directed non-magnetic channel members 25 secured to the C-field channel 23 as by spot welding. The C-field coil is designed to produce the low uniform C-field of approximately 1/20 gauss. The C-field electromagnet is secured to the base 13 by suitable fasteners 26.

The A magnet 27 is supported on the base 13 by a gimbal structure 28 which permits proper orientation of the A magnet gap along the particle path. The B magnet 29 is likewise mounted on the base 13 by means of gimbal structure 31.

The particle beam source 32, for example, an oven for producing a cesium beam, is mounted at one end of the base 13 by means of a gimbal mounting structure 33. The beam target or detector 34 is mounted at the opposite end of the base 13 in alignment with the beam path, the beam target being designed in a well known manner to convert the incident beam particles into a detectable signal.

A plurality of U-shaped magnetic shield members 41, 42 and 43 cover over the C-field magnet, A-field magnet, and the B-field magnet, respectively. Shields 41, 42, and 43 are carried from a lip on the upright portions of channel 13 by suitable fastening devices 40. These shields are made of a suitable magnetic permeable material such as, for example, Allegheny 4750 alloy and are closed off at their ends via apertured end walls.

A magnetic permeable shield 44, made of the same material as the other shields, is disposed in mutually opposed relationship to shield 41 and carried from the outside of and below channel 13 via suitable clips. The second magnetic shield 44 extends axially substantially the entire length of the C-field magnet. The legs of upper shield 41 and the lower shield 44 are disposed in overlapping relationship to completely surround the C-field magnet with shielding members, thereby minimizing the amount of stray magnetic field extending into the C-field region whereby the homogeneity of the C-field is maintained.

In operation of such beam tubes, the atomic beam is generated by the source 32 and passes into the strong inhomogeneous deflecting or A magnet 27 which causes atoms in one state to be deflected into the R.F. transition or C magnet region and atoms in the other state to be deflected out of the path. The radio frequency energy supplied into the C magnet region through the microwave assembly 17, 18, 19, produces radio frequency transitions of the particles in the homogeneous C magnet field, the particles in the beam which have undergone such transitions being deflected by the second deflecting or refocusing B magnet 29 into the detector or target 34. A more complete understanding of the details of operation of molecular beam systems may be found in the literature including a book entitled "Molecular Beams" by Norman Ramsey, Oxford Press, 1956.

In addition to the elements described above, the novel tube of the present invention is provided with pole pieces 45 at the ingress end of the C magnet structure and similar pole pieces 46 at the egress end to eliminate the possibility of Majorana transitions in these regions. The pole pieces 45 at the ingress end are shown in more detail in FIG. 3, the pole pieces at the egress end of the C magnet region being similar in construction and arrangement.

Before incorporation of these pole pieces, the end walls 41' of the C magnet shield 41 as well as the walls 42' and 43' of the A and B magnet shields 42 and 43, respectively, were provided with small apertures aligned with the beam path and through which the beam passed into and out of the C magnet section, fringing magnetic fields existed across these apertures and transverse to the beam path. During certain reorientations of the tube in the earth's field or during the presence of a changing or fluctuating magnetic field external to the tube, the fringing magnetic fields across or at the ingress and egress regions at and near walls 41' would change rapidly or even reverse in direction and would cause an undesired transition in the beam, the same as if the particles had undergone an R.F. resonance transition, and this transition or Majorana flop would be registered on the beam detector means 34.

The pole pieces or magnetic field trimmers 45 have been provided for preventing the occurrence of rapidly changing or reversing magnetic fields at these ingress and egress regions.

These flat, parallel, spaced-apart pole pieces or trimmers are made of a good magnetic material such as mumetal and are positioned with their ends closely adjacent to the A and B magnets from which they receive their magnetic flux via the fringing fields (represented by field lines 47) around the A and B magnets 27 and 29. A unidirectional magnetic field of, for example, several gauss is thus set up across the pole pieces 45 and 46. These pole pieces extend through the beam apertures in the shield walls 41', 42' and 41', 43' and thus serve to insulate the beam from any changeable fringing magnetic fields in the region of these apertures. It is noted that the pole pieces fan or flare out from each other as they near the microwave or R.F. structure, the magnetic field across these pole pieces thus decreasing gradually to a fraction of a gauss as the pole pieces near the R.F. interaction region. The pole pieces 45 and 46 may be supported by any suitable method, for example, by nonmagnetic metal strips 48 welded or otherwise attached to the pole pieces and to the shielding 41'. If desired, the pole pieces may be attached integrally to the deflecting magnet shield wall as illustrated in FIG. 5. In any case, it is desired that the pole pieces per se do not touch the C magnet shield.

In the embodiment of the invention shown in FIGS. 1, 2, 3, and 4, the pole pieces 45 were magnetized from the associated A and B magnets. FIG. 6 shows an embodiment wherein the pole pieces 45' are formed on the legs of a U-shaped magnetic member which may be magnetized by means of a D.C. coil 49 wound about the base portion of the member.

The present invention is not limited to the cesium beam tube. Certain isotopes of other alkali metals such as, for example, thallium and rubidium may be used. In general, it is contemplated that any molecular or atomic beam having desired transition characteristics may be used and the term "atomic beam" as used herein is not intended to be limited to a beam of cesium atoms.

Since many changes can be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. An atomic beam apparatus including a source of beam particles for forming and projecting a beam along a path, a deflecting magnet in said path for producing a strong magnetic field through which said beam passes, a radio frequency section aligned with said deflection magnet including means for producing a relatively weak homogeneous magnetic field through which said beam passes, a magnetic shield positioned about said ratio frequency transition section to shield said section and the weak magnetic field from the influence of external magnetic fields including the magnetic field of said deflecting magnet, said shield having an aperture therein through which said beam passes, and means extending through the aperture in said shield for producing a magnetic field across the path of said beam at the region of said aperture.

2. An atomic beam apparatus as claimed in claim 1 wherein said last means comprises a pair of spaced-apart pole pieces extending through the aperture in the shield, the pole pieces being positioned on opposite sides of the beam path and producing a magnetic field therebetween and across the path.

3. An atomic beam apparatus as claimed in claim 2 wherein said pole pieces extend in proximity to said deflecting magnet and are magnetically energized by said deflecting magnet.

4. An atomic beam apparatus as claimed in claim 2 wherein said pole pieces flare out from each other at their ends within the radio frequency transition section.

5. An atomic beam apparatus as claimed in claim 2 including a second magnetic shield positioned about said deflecting magnet, the second shield having an aperture therein aligned with the beam path and teh aperture in the first shield, the pole pieces extending through the aperture in the second shield and in proximity to the deflecting magnet from which the pole pieces are magnetically energized.

6. An atomic beam apparatus as claimed in claim 2 including a second magnetic shield positioned about said deflecting magnet, the second shield having an aperture therein aligned with the beam path and the aperture in the first shield, the pole pieces being integrally affixed to said second shield and being magnetically energized therefrom.

7. An atomic beam apparatus as claimed in claim 2 including electro-magnetic coil means for magnetically energizing said pole pieces.

8. An atomic beam apparatus including a source of beam particles for forming and projecting a beam along a path, a first deflecting magnet in said path for producing a strong magnetic field through which said beam passes, a radio frequency transition section aligned with the deflecting magnet including means for producing a relatively weak homogeneous magnetic field into which said beam passes after passing through said strong magnetic field, a second deflecting magnet in said path and aligned with said radio frequency transition section for producing a strong magnetic field through which said beam passes after passing through said radio frequency transition section, a magnetic shield positioned about said radio frequency transition section to shield said section and the weak magnetic field from the influence of external magnetic fields including the magnetic field of asid deflecting magnets, said shield having apertures in opposite ends thereof through which said beam pasess into and out of the radio frequency transition section, and means extending through each of the apertures in said shield means for producing magnetic fields across the path of said beam at the regions of the apertures.

9. An atomic beam apparatus as claimed in claim 8 wherein said last means comprises two pairs of spaced-apart pole pieces, separate pairs extending through the apertures in the shield, the pole pieces being positioned on opposite sides of the beam path and producing a magnetic field therebetween and across the path.

10. An atomic beam apparatus as claimed in claim 9 wherein the pole pieces extend in proximity to the deflecting magnets on each end of the radio frequency section and are magenticaly energized by the associated deflecting magnet.

11. An atomic beam apparatus as claimed in claim 9 wherein said pole pieces in each pair flare out from each other at their ends within the radio frequency transition section.

12. An atomic beam apparatus as claimed in claim 9 including magnetic shields positioned about each of the deflecting magnets, these latter shields each having an aperture therein aligned with the beam path and the apertures in the first shield, the pole pieces extending through the apertures in the deflecting magnet shields in proximity to the deflecting magnets from which the pole pieces are magnetically energized.

13. An atomic beam apparatus as claimed in claim 9 including magnetic shields positioned about each of the deflecting magnets, these latter shields each having an aperture therein aligned with the beam path and the apertures in the first shield, the pole pieces being integrally affixed to the deflecting magnet shields and being magnetically energized therefrom.

No references cited.

ELI LIEBERMAN, *Primary Examiner.*

HERMAN K. SAALBACH, SAXFIELD CHATMON, JR., *Assistant Examiners.*